(12) United States Patent
Osamura et al.

(10) Patent No.: US 9,336,603 B2
(45) Date of Patent: May 10, 2016

(54) INFORMATION PROCESSING DEVICE AND INFORMATION PROCESSING METHOD

(71) Applicant: FUJITSU LIMITED, Kawasaki-shi, Kanagawa (JP)

(72) Inventors: Kazuki Osamura, Kawasaki (JP); Taichi Murase, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/185,106

(22) Filed: Feb. 20, 2014

(65) Prior Publication Data

US 2014/0294233 A1 Oct. 2, 2014

(30) Foreign Application Priority Data

Apr. 2, 2013 (JP) ................................. 2013-077203

(51) Int. Cl.
*G06K 9/00* (2006.01)
*G06T 7/00* (2006.01)
*G06F 3/03* (2006.01)
*G06F 3/042* (2006.01)

(52) U.S. Cl.
CPC ............ *G06T 7/0075* (2013.01); *G06F 3/0304* (2013.01); *G06F 3/0425* (2013.01); *G06F 3/0426* (2013.01); *G06T 2207/10021* (2013.01)

(58) Field of Classification Search
CPC ................ G06T 7/0075; G06T 7/2086; G06T 2207/10021; G06F 3/0425; G06F 3/0304; G06F 3/0325

USPC ....... 382/103, 154; 345/419; 356/12; 348/42, 348/47
See application file for complete search history.

(56) References Cited

U.S. PATENT DOCUMENTS

| | | | | |
|---|---|---|---|---|
| 2006/0222238 | A1* | 10/2006 | Nishiyama | 382/154 |
| 2007/0122027 | A1* | 5/2007 | Kunita et al. | 382/154 |
| 2008/0244468 | A1* | 10/2008 | Nishihara et al. | 715/863 |
| 2012/0068917 | A1* | 3/2012 | Huang et al. | 345/156 |
| 2012/0256824 | A1* | 10/2012 | Mizunuma et al. | 345/156 |

OTHER PUBLICATIONS

Fujiyoshi et al. "Fast 3D Position Measurement with Two Unsynchronized Cameras", Proceedings 2003 IEEE International Symposium on Computational Intelligence in Robotics and Automation, Jul. 16-20, 2003, Japan, pp. 1239-1244.*
S. Shimizu, "Study on high-speed three-dimensional position estimation using multiple asynchronous cameras"; 2005 (translation of p. 18, line 1 to p. 20, line 7).

* cited by examiner

*Primary Examiner* — Samir Ahmed
(74) *Attorney, Agent, or Firm* — Westerman, Hattori, Daniels & Adrian, LLP

(57) ABSTRACT

An information processing device includes, a processor; and a memory which stores a plurality of instructions, which when executed by the processor, cause the processor to execute, acquiring images which includes a target object, and the images captured by a plurality of cameras on a time series basis; calculating a plurality of distance from the plurality of each cameras to a target object by using the images; and correcting, in a case where the target object has reached a predetermined x-y plane and a difference in an area of the target object between the images is equal to or less than a predetermined first threshold, the distance that has been calculated to a distance from the cameras to the x-y plane.

9 Claims, 9 Drawing Sheets

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2013-077203, filed on Apr. 2, 2013, the entire contents of which are incorporated herein by reference.

FIELD

The embodiments disclosed herein are related to an information processing device, an information processing method, and a computer-readable storage medium storing an information processing program.

BACKGROUND

As a method of estimating the three-dimensional position of an object from images, a twin-lens stereo method is available. A twin-lens stereo method estimates the distance to a target object, on the basis of the principle of triangulation, from images that have been respectively captured by two cameras arranged parallel to each other, the positional relationship of the cameras being known, by using a displacement (disparity), in terms of pixels, of a single object (target object) between the images. In the twin-lens stereo method, it is difficult to synchronize the timings of acquiring images between cameras. When an image of a moving target object is captured, the disparity changes and accurate estimation of the distance to the target object is impossible, which has been an issue. To address such an issue, Shimizu and Fujiyoshi (Chubu University), "Fukusu Hidouki Kamera wo Mochiita Kosoku Sanjigen Ichi Suitei ni Kansuru Kenkyu (Study on high-speed three-dimensional position estimation using multiple asynchronous cameras)", 2005 discloses a technique in which a corresponding point in a frame that does not exist is created imaginarily and the corresponding imaginary point that has been created and an observed point are used to estimate the three-dimensional position of a target object.

SUMMARY

In accordance with an aspect of the embodiments, an information processing device includes, a processor; and a memory which stores a plurality of instructions, which when executed by the processor, cause the processor to execute, acquiring images which includes a target object, and the images captured by a plurality of cameras on a time series basis; calculating a plurality of distance from the plurality of each cameras to a target object by using the images; and correcting, in a case where the target object has reached a predetermined x-y plane and a difference in an area of the target object between the images is equal to or less than a predetermined first threshold, the distance that has been calculated to a distance from the cameras to the x-y plane.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, embodiments of an information processing device, an information processing method, and an information processing program will be described in detail with reference to the drawings. Note that the embodiments are not intended to limit the technique disclosed herein. Furthermore, the embodiments may be combined with each other, as appropriate, as long as such a combination does not cause a contradiction in processing.

(First Embodiment)

Figure 1:
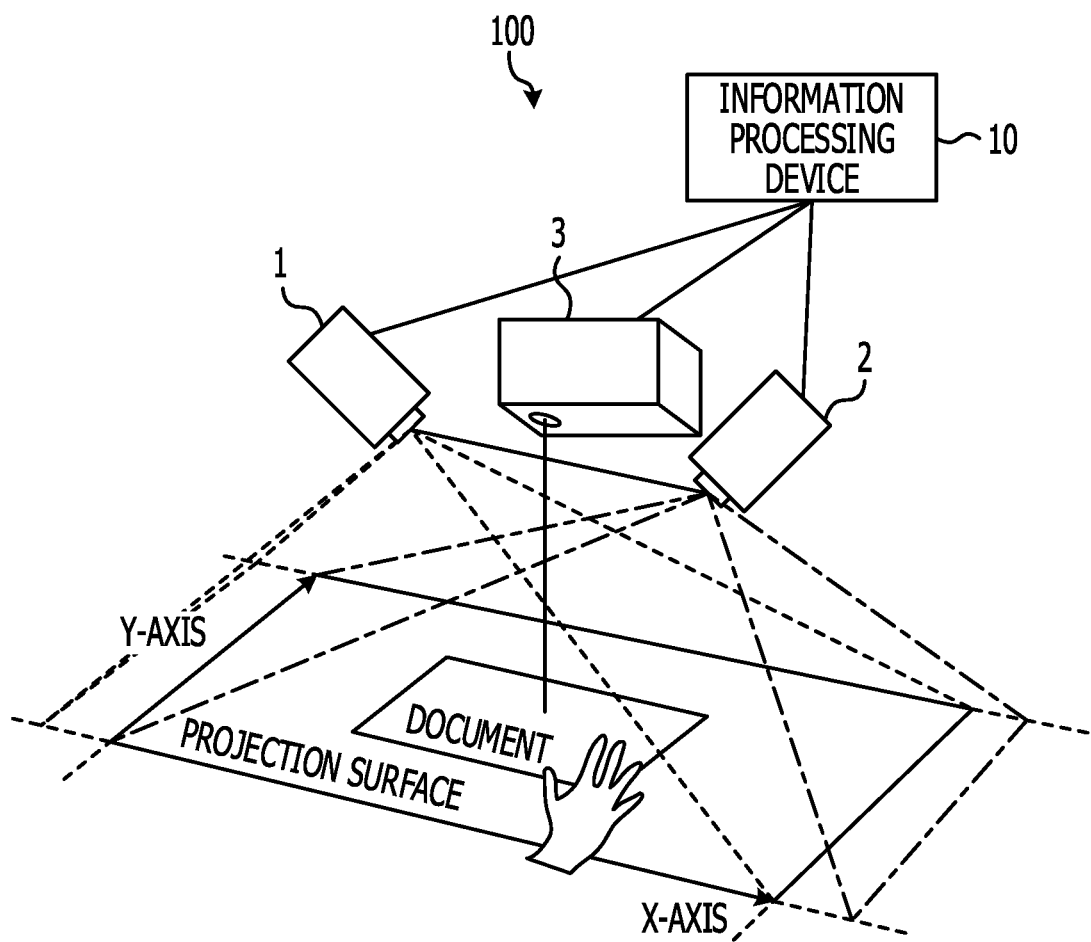
FIG. 1 is a schematic diagram illustrating an example of an overall configuration of a position calculation system.

FIG. 1 is a schematic diagram illustrating an example of an overall configuration of a position calculation system. As illustrated in FIG. 1, a position calculation system 100 includes cameras 1 and 2, a projector (display apparatus) 3, and an information processing device 10. The information processing device 10 is connected to the cameras 1 and 2 and the projector 3 over a network (not illustrated) so as to allow communication with one another.

The projector 3 is an apparatus that projects an image or a picture on a screen or the like. For example, the projector 3 projects an image of a document on a predetermined projection surface such as a tabletop or a board. The cameras 1 and 2 are apparatuses that capture images. For example, the cameras 1 and 2 capture images of a document projected on a projection surface, images of a target object (for example, the hand or the finger of an operator), and the like. The information processing device 10 is an apparatus that processes input-ted information. For example, the information processing device 10 calculates the three-dimensional position of a target object from time series images captured by the cameras 1 and 2. The information processing device 10 thereafter determines an operation performed on a document on the basis of the three-dimensional position of a target object that has been calculated. For example, the information processing device 10 determines which information in a projected document has been touched (selected) by a target object or whether touching has been stopped (selection has been canceled), for example.

Note that examples of the network used to connect the cameras 1 and 2 and the projector 3 include any communication network, such as a local area network (LAN) or a virtual private network (VPN), regardless of whether the network is wired or wireless. The timings of acquiring images do not have to be synchronized between the cameras 1 and 2. The position calculation system 100 may include three or more cameras. It is assumed that the projector 3 and the information processing device 10 are connected to each other over a network, however, they do not have to be connected to each other. A description will be given of a case where a target object, images of which are captured by the cameras 1 and 2, is the hand or the finger of an operator of a projected document, for example. However, a target object is not limited to this and may be a pen, a stick, or the like.

Figure 2:
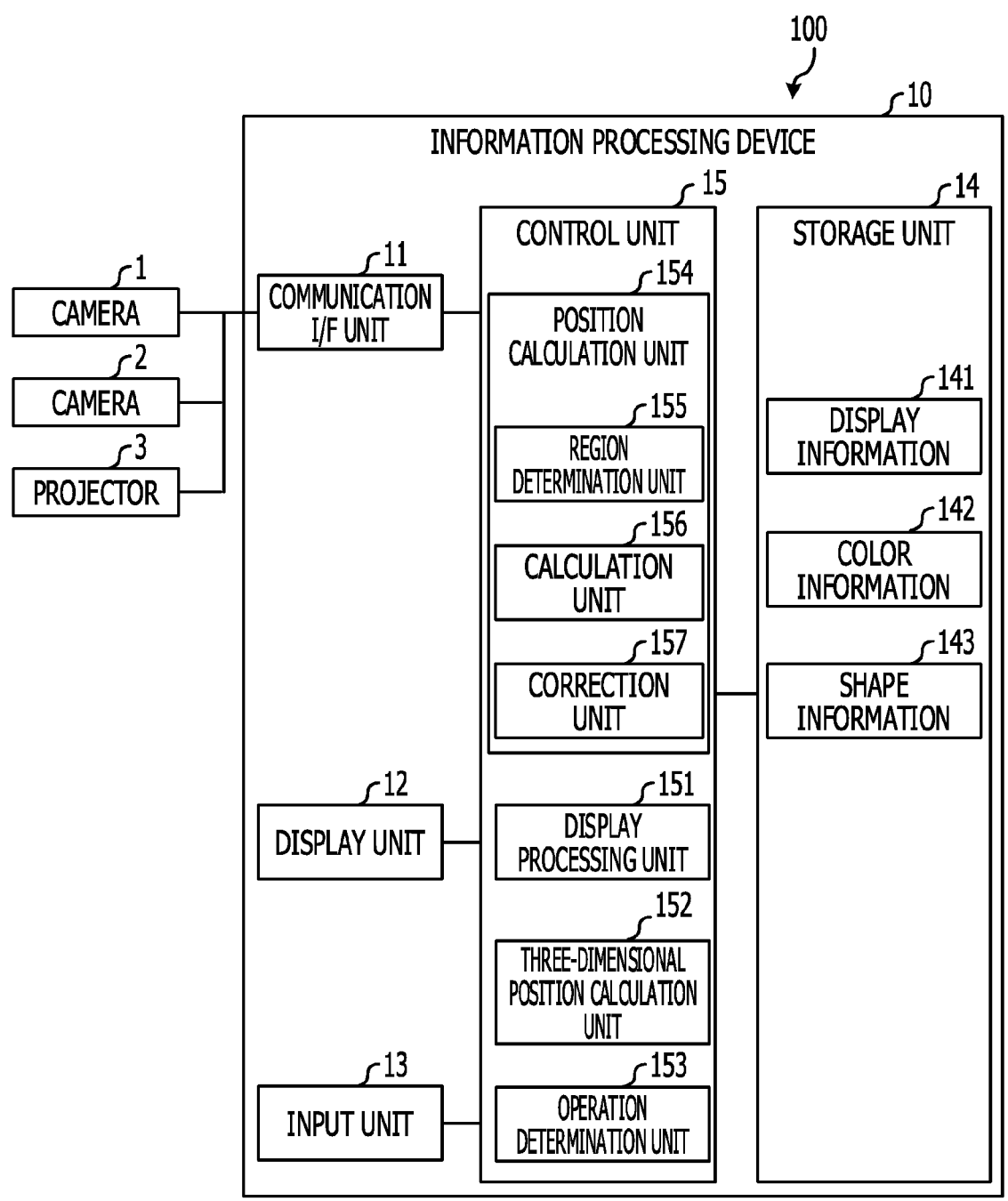
FIG. 2 is a diagram illustrating an overall configuration of an information processing device.

Next, the information processing device 10 according to a first embodiment will be described with reference to FIG. 2. FIG. 2 is a diagram illustrating an overall configuration of an information processing device. As illustrated in FIG. 2, the information processing device 10 includes a communication interface (I/F) unit (acquisition unit) 11, a display unit 12, an input unit 13, a storage unit 14, and a control unit 15.

The communication I/F unit 11 is an interface that controls communication with other apparatuses. The communication I/F unit 11 receives information of various types over a network. For example, the communication I/F unit 11 receives images of a document or a target object that have been captured from the cameras 1 and 2. One aspect of the communication I/F unit 11 is a network interface card, such as a LAN card.

The display unit 12 is a display device that displays information of various types. For example, the display unit 12 is a display device, such as a liquid crystal display (LCD) or a cathode ray tube (CRT). The display unit 12 displays information of various types. For example, the display unit 12 displays information stored in the storage unit 14.

The input unit 13 is an input device used to input information of various types. For example, the input unit 13 is an input device, such as a mouse, a keyboard, or a touch sensor. The input unit 13 outputs information inputted by a user of the information processing device 10 to the control unit 15. For example, when the input unit 13 receives information that is a source of display information 141, color information 142, shape information 143, or the like, which will be described below, the input unit 13 outputs the information to the control unit 15 and makes, via the control unit 15, the storage unit 14 store the information.

The storage unit 14 is a nonvolatile storage device, such as a hard disk, a solid state drive (SSD), or an optical disk. Note that the storage unit 14 may be a data-rewritable semiconductor memory, such as a random access memory (RAM), a flash memory, or a nonvolatile static random access memory (NVSRAM).

The storage unit 14 stores an operating system (OS) and various programs executed by the control unit 15. The storage unit 14 stores data of various types used by a program or data of various types generated by a program. For example, the storage unit 14 stores the display information 141, the color information 142, and the shape information 143. The display information 141 is information (for example, the foregoing document) to be projected on a projection surface by the projector 3 via the control unit 15. The color information 142 is information regarding the range of color of an object that may be a target object. The range of color is defined by hue and saturation in the hue, saturation, and value (HSV) color system. The color information 142 is referred to when the control unit 15 detects the region of a target object (for example, the region of a hand). The shape information 143 is information regarding the shape of a target object (for example, a hand) and the feature point of the shape (for example, a fingertip). The shape information 143 is referred to when the control unit 15 detects the feature point of a target object.

The control unit 15 is a device that controls the information processing device 10. As the control unit 15, an electronic circuit, such as a central processing unit (CPU) or a micro processing unit (MPU), or an integrated circuit, such as an application specific integrated circuit (ASIC) or a field programmable gate array (FPGA), may be employed. The control unit 15 includes an internal memory for storing programs that specify various processing procedures and control data, which are used to perform processing of various types. For example, the control unit 15 runs various programs and functions as various processing units.

The control unit 15 includes a display processing unit 151, a three-dimensional position calculation unit 152, an operation determination unit (determination unit) 153, and a position calculation unit 154.

The display processing unit 151 makes, via the communication I/F 11, the projector 3 project the display information 141 on a predetermined projection surface. The display processing unit 151 makes information of various types that are stored in the storage unit 14 displayed on the display unit 12.

The three-dimensional position calculation unit 152 calculates the three-dimensional position of a target object by using a twin-lens stereo method or the like on the basis of time series images acquired from the cameras 1 and 2 via the communication I/F unit 11. The three-dimensional position calculation unit 152 calculates the x-y coordinates of a target object while assuming that the projection surface illustrated in FIG. 1 is an x-y plane. The three-dimensional position calculation unit 152 calculates the distance from the cameras 1 and 2 to the target object. Here, it is assumed that the distance from the cameras 1 and 2 to the target object that is calculated is the distance from the midpoint between the cameras 1 and 2 to the target object.

Figure 3:
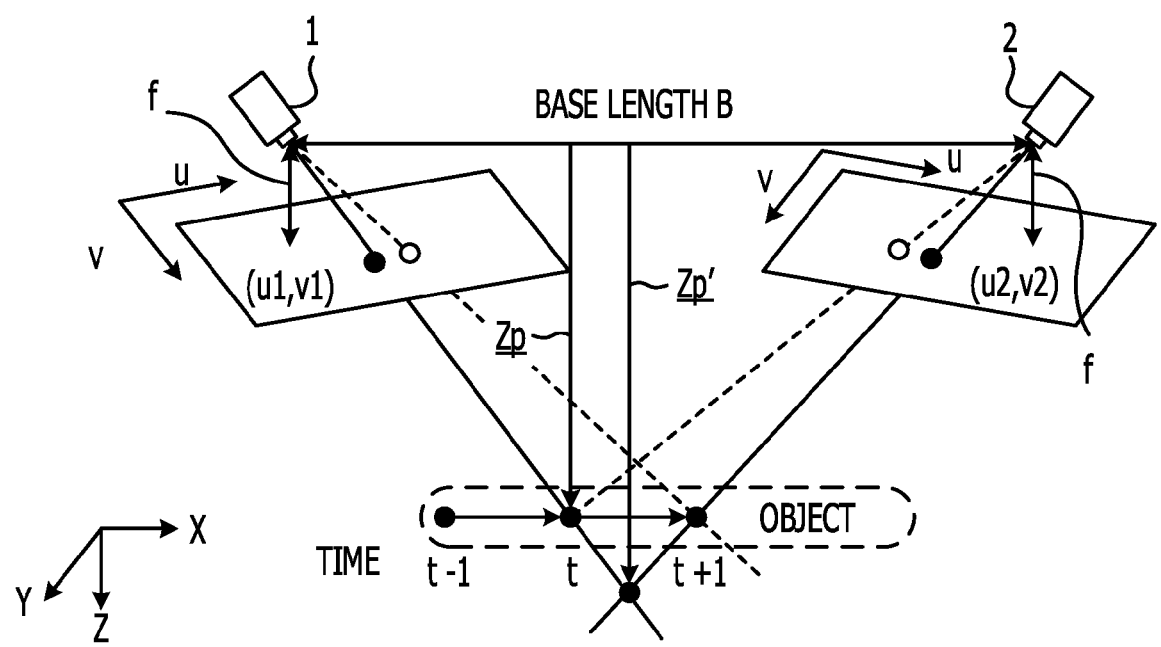
FIG. 3 is a diagram illustrating a method of calculating the distance to a target object by using a twin-lens stereo method.

An overview of calculation of the distance from cameras to a target object in a twin-lens stereo method will be described with reference to FIG. 3. FIG. 3 is a diagram illustrating a method of calculating the distance to a target object by using a twin-lens stereo method. A twin-lens stereo method estimates the distance from the cameras to the target object from images that have been respectively captured by two cameras arranged parallel to each other, the positional relationship of the cameras being known, by using a displacement (disparity), in terms of pixels, of a single target object between the images. For example, in the case where the cameras 1 and 2 illustrated in FIG. 3 are used, a distance Zp, which is the distance from the midpoint between the cameras 1 and 2 to the target object (the object at a time t in FIG. 3), is calculated by using expressions (1) and (2) below.

$$d:f=B:Zp \qquad \text{expression (1)}$$

$$Zp=Bf/d \qquad \text{expression (2)}$$

Here, f in expressions (1) and (2) is the focal length of the cameras 1 and 2 and B is the distance between the cameras 1 and 2. u1 represents the coordinates (position) of a target object in an image captured by one camera (for example, the camera 1). u2 represents the coordinates (position) of the target object in an image captured by the other camera (for example, the camera 2). The disparity d is expressed by |u1−u2|.

The description now returns to FIG. 2. The operation determination unit 153 determines an operation that has been performed on an image (that is, the display information 141) projected on a projection surface on the basis of the three-dimensional position of a target object. For example, first, when the operation determination unit 153 detects placement (touching) of a target object on a projection surface, the operation determination unit 153 activates the position calculation unit 154. The operation determination unit 153 determines an operation that has been performed on an image (that is, the display information 141) projected on the projection surface on the basis of the three-dimensional position of the target object that has been calculated by the position calculation unit 154. For example, the operation determination unit 153 determines whether touching has been stopped on the basis of the distance from the cameras 1 and 2 to the target object that has been calculated by the position calculation unit 154.

Placement (touching) of the target object on the projection surface is detected by determining whether or not the distance from the cameras 1 and 2 to the target object that has been calculated by the three-dimensional position calculation unit 152 is equal to the distance from the cameras 1 and 2 to the projection surface (x-y plane). In other words, if the distance from the cameras 1 and 2 to the target object is equal to the distance from the cameras 1 and 2 to the projection surface (x-y plane), the operation determination unit 153 determines that the target object has been placed (has touched) on the projection surface. On the other hand, if the distance from the cameras 1 and 2 to the target object is less than the distance from the cameras 1 and 2 to the projection surface (x-y plane), the operation determination unit 153 determines that the target object has not been placed (has not touched) on the projection surface. It is assumed that the distance from the cameras 1 and 2 to the projection surface is stored in a predetermined space of the storage unit 14.

The position calculation unit 154 acquires, via the communication I/F unit 11, images captured by the cameras 1 and 2 on a time series basis and calculates or corrects the distance from the cameras 1 and 2 to the target object on the basis of the images. For example, the position calculation unit 154 calculates or corrects the distance from the cameras 1 and 2 to the target object during a period from when the operation determination unit 153 detects placement of the target object on the projection surface until when the operation determination unit 153 detects removal of the target object away from the projection surface. The position calculation unit 154 includes a region determination unit 155, a calculation unit 156, and a correction unit 157.

The region determination unit 155 refers to the color information 142 and detects the region of a target object in an image. For example, when the target object is a hand, the region determination unit 155 detects the region of the hand on the basis of the color information 142, which provides information on the color of a hand, and colors of pixels in an image that has been acquired. As the color information 142, expressions (3) and (4) below are used, for example. Note that expression (3) expresses a condition on the value of hue (H) in the case where the pixel values of an image are expressed in accordance with the HSV color system. Expression (4) expresses a condition on the value of saturation (S) in the case where the pixel values of an image are expressed in accordance with the HSV color system.

$$0.11 < H < 0.22 \quad \text{expression (3)}$$

$$0.2 < S < 0.5 \quad \text{expression (4)}$$

The region determination unit 155 calculates the area of the region of a target object that has been detected. For example, the region determination unit 155 generates a binary image by setting "1 (black)" for a pixel, among pixels in an image that has been acquired, which meets a condition on color and setting "0 (white)" for a pixel, among the pixels in the image that has been acquired, which does not meet the condition on color. The region determination unit 155 thereafter determines the pixel number of the region to be the area of the region. Note that, in the case where the color of an image is expressed in accordance with a color system other than the HSV color system, the region determination unit 155 converts the color of the image into the color expressed in accordance with the HSV color system.

The calculation unit 156 refers to the shape information 143 and detects the feature point of a target object on the basis of the shape of the region of the target object. For example, in the case where the target object is a hand, the calculation unit 156 detects the fingertip portion of the hand by performing pattern matching of a geometric model of the fingertip portion of the hand provided by the shape information 143 with the shape of the region of the hand that has been detected by the region determination unit 155. The calculation unit 156 thereafter calculates the x-y coordinates of the feature points of the target objects in binary images obtained on the basis of images from the cameras 1 and 2 respectively. Furthermore, the calculation unit 156 calculates the distance from the cameras 1 and 2 to the feature point of the target object on the basis of expressions (1) and (2) described above.

In the case where the feature point of the target object has reached the projection surface (predetermined x-y plane), the correction unit 157 determines whether or not a difference in the area of the target object between a plurality of images that have been acquired from the cameras 1 and 2 on a time series basis is equal to or less than a predetermined threshold. For example, the correction unit 157 determines whether or not a difference in the area of the target object between an image acquired from the camera 1 at a predetermined time t−1 and an image acquired from the camera 1 at a present time t is equal to or less than a predetermined threshold. Here, if the difference in the area of the target object between the images is equal to or less than a predetermined threshold, the correction unit 157 corrects the distance from the cameras 1 and 2 to the feature point of the target object that has been calculated by the calculation unit 156 to the distance from the cameras 1 and 2 to the projection surface (a reference distance). On the other hand, if the difference in the area of the target object between the images exceeds the predetermined threshold, the correction unit 157 adopts the distance to the target object that has been calculated by the calculation unit 156 as the distance from the cameras 1 and 2 to the feature point of the target object. On the basis of information on the distance thus calculated or corrected, the operation determination unit 153 determines an operation or the like performed on the projection surface, such as placement of the target object on the projection surface or removal of the target object away from the projection surface.

Here, a description will be given below of the reason why the correction unit 157 corrects the distance from the cameras 1 and 2 to the feature point of the target object that has been calculated by the calculation unit 156 to the distance from the cameras 1 and 2 to the projection surface (the reference distance) in the case where the difference in the area of the target object between the images is equal to or less than the predetermined threshold.

Figure 4:
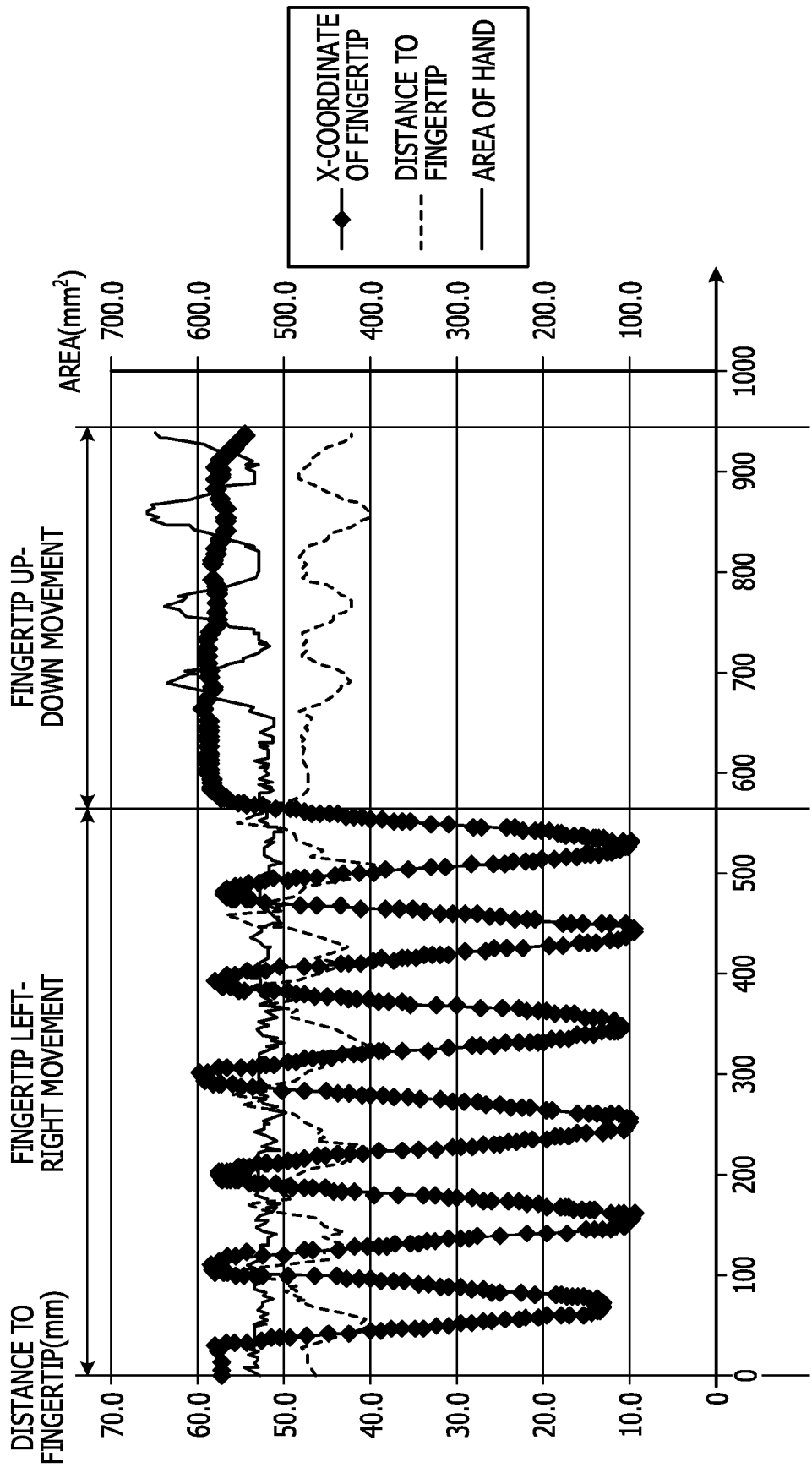
FIG. 4 is a diagram illustrating an example of changes, in accordance with movement of a fingertip, in the x-coordinate of the fingertip, the distance to the fingertip, and the area of the hand.

For example, a case where the fingertip of a hand, which is a target object, moves on the projection surface (x-y plane) in the left-right direction (x-direction) is assumed. FIG. 4 is a diagram illustrating an example of changes, in accordance with movement of a fingertip, in the x-coordinate of the fingertip, the distance to the fingertip, and the area of the hand.

In this case, the x-coordinate of the fingertip and the distance from the cameras 1 and 2 to the fingertip calculated by the three-dimensional position calculation unit 152 and the area of the hand calculated by the region determination unit 155 on the basis of time series images captured by the cameras 1 and 2 have values as illustrated in FIG. 4. More specifically, when the fingertip moves in the left-right direction (x-direction), the distance from the cameras 1 and 2 to the fingertip changes while the area of the hand remains substantially unchanged. On the other hand, when the fingertip moves in the up-down direction (z-direction) while the x-coordinate (position) of the fingertip remains substantially unchanged, the calculated area of the hand becomes larger as the distance from the cameras 1 and 2 to the fingertip decreases, and the calculated area of the hand becomes smaller as the distance from the cameras 1 and 2 to the fingertip increases.

Figure 5:
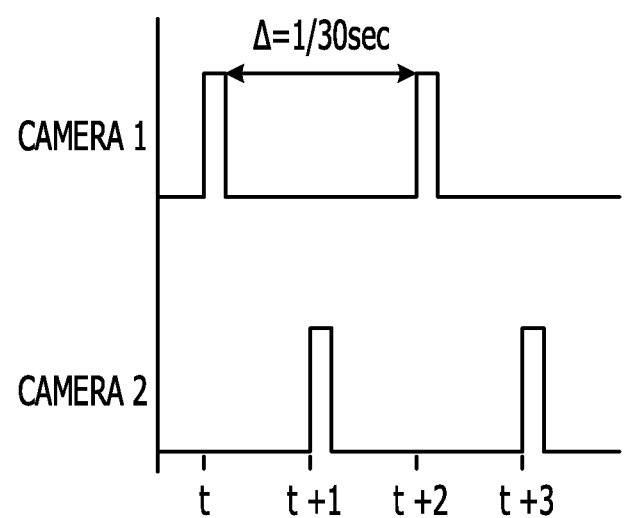
FIG. 5 is a diagram illustrating an example of shutter timings of cameras.

The reason why the distance from the cameras 1 and 2 to the fingertip changes when the fingertip moves in the left-right direction (x-direction) will be described with reference to FIGS. 3 and 5. FIG. 5 is a diagram illustrating an example of shutter timings of cameras. For example, in the case where a target object moves from a position at a time t to a position at a time t+1 on the projection surface as illustrated in FIG. 3, if the shutter timings of the cameras 1 and 2 are different as illustrated in FIG. 5, a disparity caused by the cameras 1 and 2 changes. Because of the change in disparity, there is a possibility that the distance Zp, which is the distance from the cameras 1 and 2 to the target object (to the feature point of the target object) calculated using a twin-lens stereo method becomes a distance Zp'.

Figure 6A:
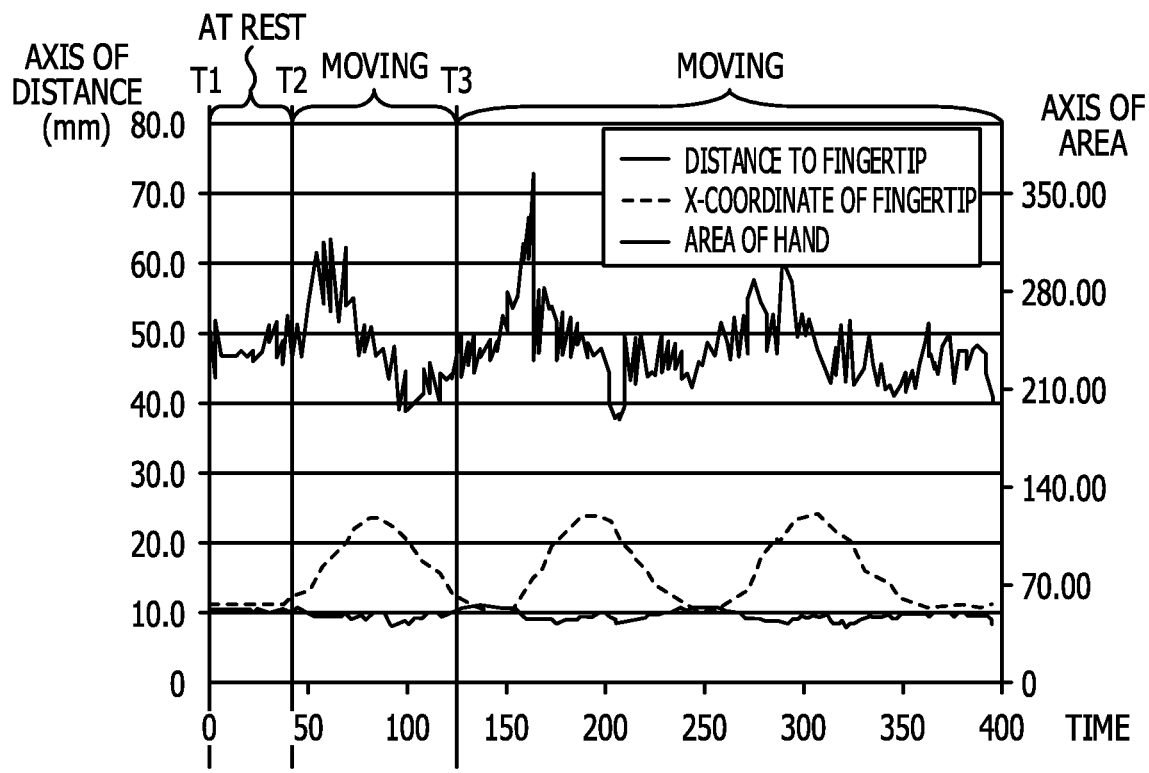
FIGS. 6A to 6C are diagrams illustrating an example of changes, in accordance with movement of a fingertip, in the x-coordinate of the fingertip, the distance to the fingertip, and the area of the hand.
Figure 6B:
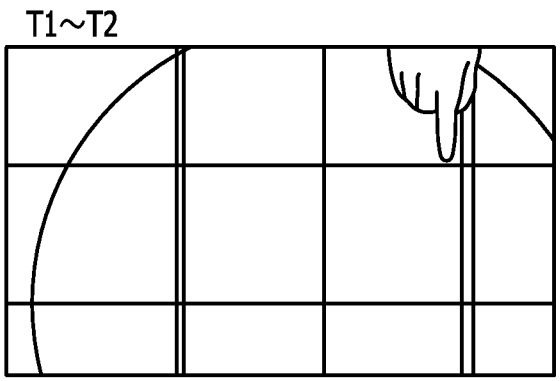
Figure 6C:
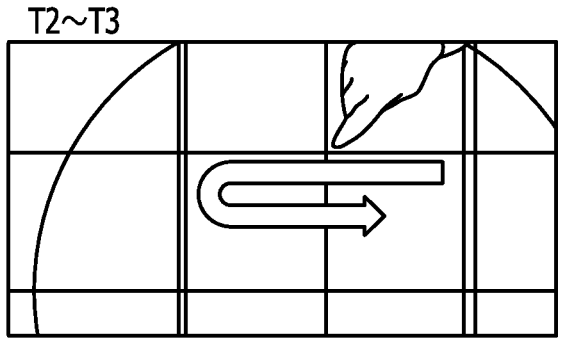
Figure 7:
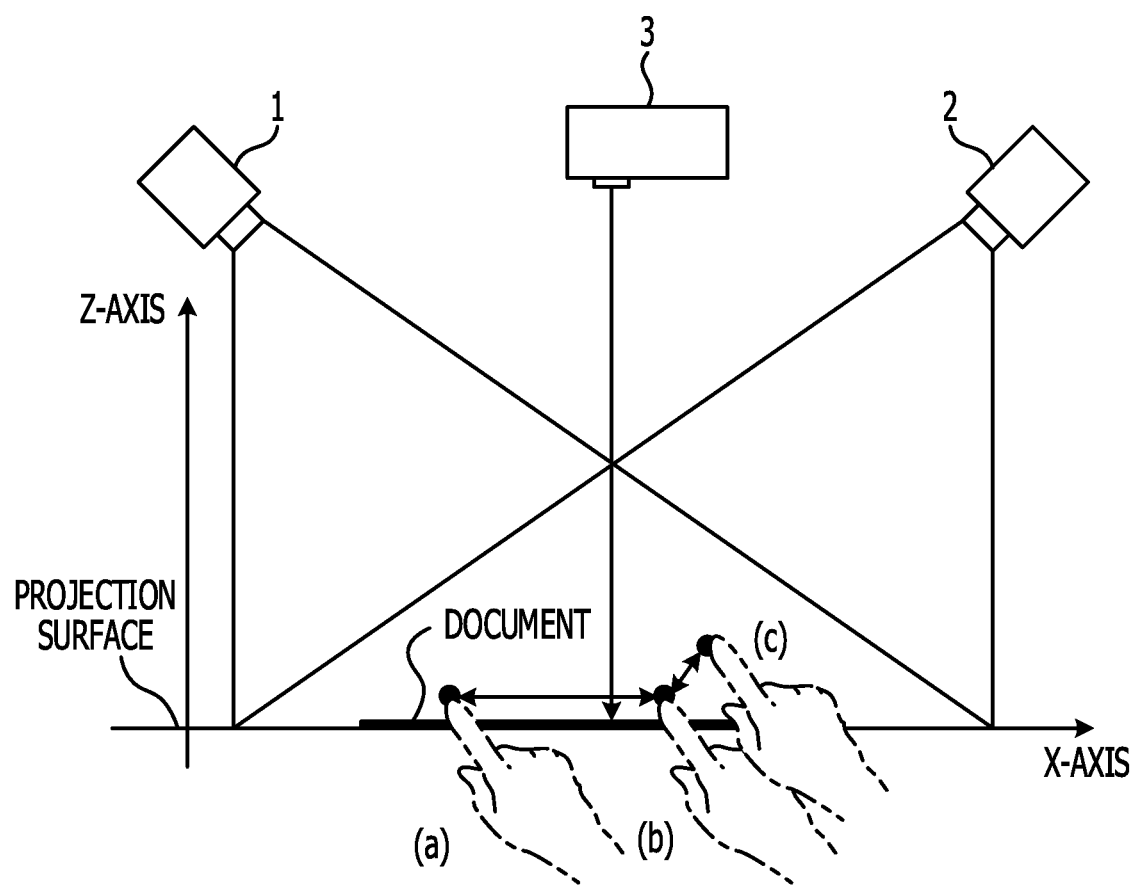
FIG. 7 is a diagram illustrating an example of movement of a target object on a projection surface.

FIGS. 6A to 6C are diagrams illustrating an example of changes, in accordance with movement of a fingertip, in the x-coordinate of the fingertip, the distance to the fingertip, and the area of the hand. As illustrated in FIGS. 6A and 6B, during a time period from T1 to T2 (that is, in a scene in which the fingertip remains at rest) in a picture, the area of the hand and the distance to the fingertip remains substantially unchanged. On the other hand, as illustrated in FIGS. 6A and 6C, during a time period from T2 to T3 (that is, in a scene in which the fingertip moves horizontally), the area of the hand remains unchanged but the distance from the cameras 1 and 2 to the fingertip changes because of a change in disparity caused by different shutter timings of the cameras 1 and 2. However, the fingertip remains placed on the projection surface and therefore the actual distance from the cameras 1 and 2 to the fingertip does not change. Accordingly, if the amount of change in the area of the hand, which is a target object, is equal to or less than a threshold, the correction unit 157 corrects the distance from the cameras 1 and 2 to the fingertip to the distance from the cameras 1 and 2 to the fingertip when the fingertip remains at rest. In other words, the correction unit 157 corrects the distance from the cameras 1 and 2 to the fingertip to the distance from the cameras 1 and 2 to the projection surface (reference distance). In this way, it is possible to decrease the probability of erroneous determination of an operation when the operation determination unit 153 determines an operation in accordance with the distance from the cameras 1 and 2 to the target object, for example. FIG. 7 is a diagram illustrating an example of movement of a target object on a projection surface. For example, in FIG. 7, it is possible to decrease the probability of erroneous determination made by the operation determination unit 153 that touching of the fingertip has been stopped as in movement (c) although the fingertip has actually touched on a document projected on the projection surface and slid from a position (a) to a position (b).

Figure 8:
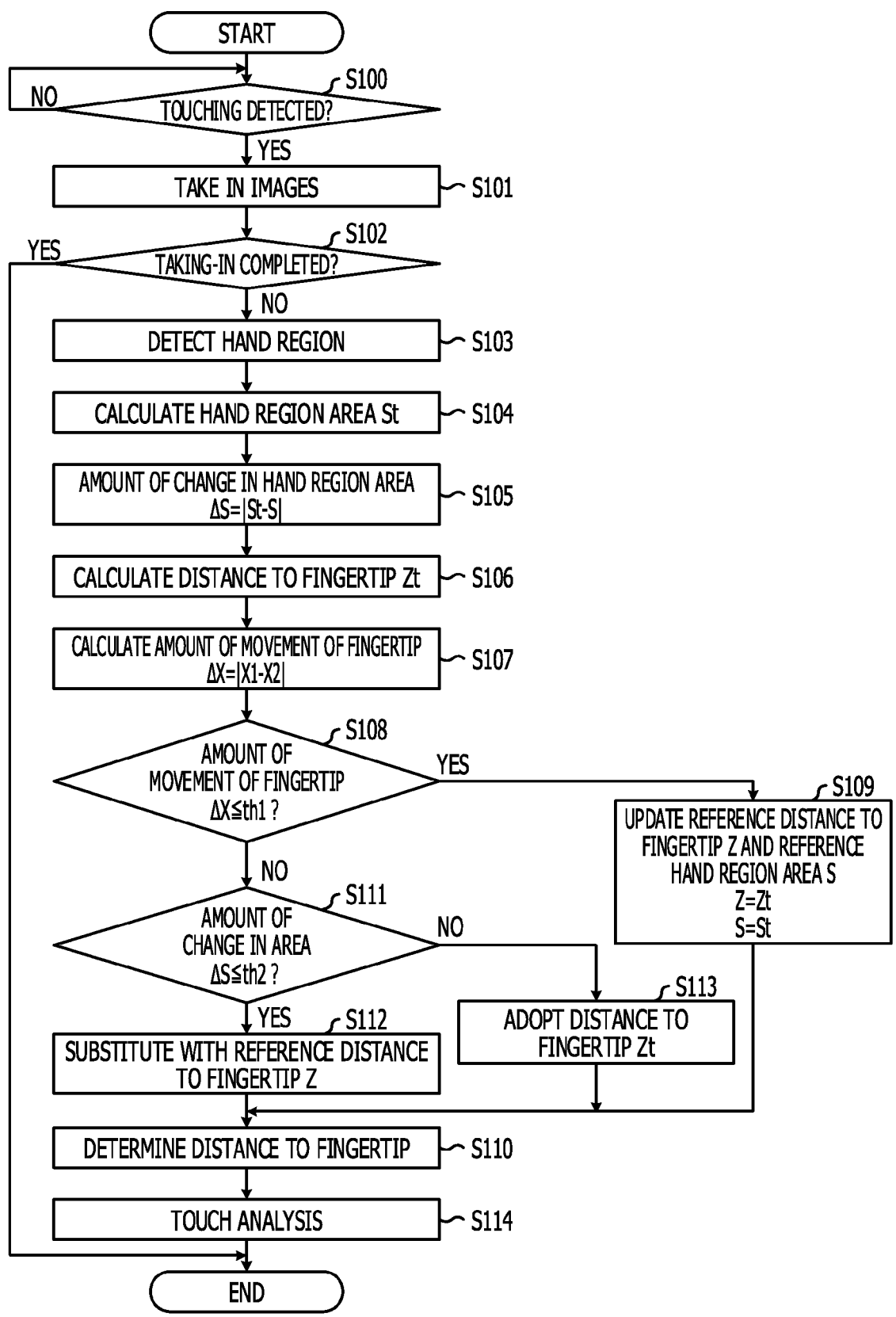
FIG. 8 is a flowchart illustrating a procedure of processing from detection of touching on a projection surface to a touch analysis performed by an information processing device.

Next, a flow of processing from detection of touching on a projection surface to a touch analysis performed by the information processing device 10 of this embodiment will be described. FIG. 8 is a flowchart illustrating a procedure of processing from detection of touching on a projection surface to a touch analysis performed by an information processing device. Here, a description will be given of a case where the target object is a hand, the feature point of the target object is the fingertip of the hand, and the information processing device 10 performs an analysis on touching on a projection surface on the basis of the distance from the cameras 1 and 2 to the fingertip of the hand (distance to the fingertip), for example.

First, if the operation determination unit 153 of the information processing device 10 determines that the hand has touched on the projection surface (Yes in S100), the operation determination unit 153 takes in time series images captured by the cameras 1 and 2 (S101). On the other hand, if the operation determination unit 153 determines that the hand has not yet touched on the projection surface (No in S100), the operation determination unit 153 does not perform processing of S101. After S101, if taking-in of the images has been completed (Yes in S102), the operation determination unit 153 ends the processing. If taking-in of the images has not been completed (No in S102), the operation determination unit 153 activates the position calculation unit 154. The region determination unit 155 refers to the color information 142, detects the region of the hand in the images that have been taken in (S103), and calculates an area St, which is the area of the region of the hand (S104). Next, the correction unit 157 calculates the amount of change in the area of the region of the hand ΔS=|St−S|, which is a difference between the area St calculated in S104 and the area of the region of the hand in an image that serves as a reference (reference hand region area S) (S105). Here, as an image serving as a reference, an image captured when the hand has touched on the projection surface is used, for example.

Next, the calculation unit 156 detects the fingertip portion of the hand by using images captured by the cameras 1 and 2 and the shape information 143 and calculates a distance Zt (distance to the fingertip), which is the distance from the cameras 1 and 2 to the fingertip of the hand (S106). The calculation unit 156 calculates the amount of movement ΔX=|X1−X2|, which is the amount of movement of the fingertip of the hand in the x-direction (S107). Note that X1 represents the x-coordinate of the fingertip in an image at a present time and X2 is the x-coordinate of the fingertip in an image at a previous time.

If the amount of movement of the fingertip ΔX is equal to or less than a predetermined threshold th1 (Yes in S108), the processing proceeds to S109 and the correction unit 157 updates the distance from the cameras 1 and 2 to the fingertip (reference distance to the fingertip Z) and the reference hand region area S in an image that serves as a reference. In other words, if the amount of movement of the fingertip ΔX is equal to or less than the predetermined threshold th1, it is determined that the fingertip is substantially in a state of rest and therefore the correction unit 157 replaces the reference distance to the fingertip Z with the distance Zt calculated in S106. Furthermore, the correction unit 157 replaces the reference hand region area S with the area St calculated in S104. The flow thereafter proceeds to S110 and the position calculation unit 154 determines the distance to the fingertip. Here, the position calculation unit 154 determines the distance to the fingertip Zt calculated in S106 to be the distance to the fingertip.

On the other hand, if the amount of movement of the fingertip $\Delta X$ is larger than the threshold th1 (No in S108) and the amount of change in the area $\Delta S$ is equal to or less than a predetermined threshold th2 (for example, 50.0 mm$^2$) (Yes in S111), the flow proceeds to S112 and the correction unit 157 substitutes the distance to the fingertip Zt with the reference distance to the fingertip Z. In other words, the correction unit 157 corrects the distance to the fingertip Zt calculated in S106 to the reference distance to the fingertip Z. More specifically, in the case where movement of the fingertip in the x-direction has been observed and the area of the region of the hand has changed, it is more likely that the finger has slid in the x-direction while it has remained placed on the projection surface. Therefore, the correction unit 157 replaces the distance to the fingertip Zt calculated in S106 with the reference distance to the fingertip Z. The flow thereafter proceeds to S110 and the position calculation unit 154 determines the distance to the fingertip. Here, the position calculation unit 154 determines the reference distance to the fingertip Z to be the distance to the fingertip.

If the amount of change in the area $\Delta S$ is larger than the predetermined threshold th2 (No in S111), the flow proceeds to S113 and the position calculation unit 154 adopts the distance to the fingertip Zt calculated in S106 as the distance to the fingertip. More specifically, if the amount of change in the area of the region of the hand is larger than the predetermined threshold th2, it is more likely that the fingertip of the hand has moved in the up-down direction and therefore the position calculation unit 154 adopts the distance to the fingertip Zt calculated in S106 as the distance to the fingertip. The flow thereafter proceeds to S110 and the position calculation unit 154 determines the distance to the fingertip Zt calculated in S106 to be the distance to the fingertip.

After S110, the operation determination unit 153 performs an analysis on touching of the fingertip on the projection surface on the basis of the distance to the fingertip determined in S110 (S114). More specifically, if the distance to the fingertip that has been determined is substantially equal to the distance from the cameras 1 and 2 to the projection surface (reference distance to the fingertip Z), the operation determination unit 153 determines that the fingertip has remained touching on the projection surface. On the other hand, if the distance to the fingertip that has been determined is less than the distance from the cameras 1 and 2 to the projection surface (reference distance to the fingertip Z), the operation determination unit 153 determines that touching of the fingertip on the projection surface has been stopped. In this way, the operation determination unit 153 is able to determine whether or not the display information 141 has been selected by touching on the display information 141 (a document or the like) projected on the projection surface, for example.

With the technique disclosed in the first embodiment, the information processing device 10 is able to calculate a substantially accurate value of the distance between a moving target object and the cameras 1 and 2 even if the cameras 1 and 2 are asynchronous cameras. Furthermore, the information processing device 10 is able to calculate a substantially accurate value of the distance from the cameras 1 and 2 to a target object and therefore it is possible to decrease the probability of erroneous determination as to whether or not the display information 141 projected on the projection surface has been selected. In the case where the information processing device 10 determines that the movement length of a target object on the projection surface exceeds the predetermined threshold th1, the information processing device 10 determines whether or not a correction is to be made on the distance from the cameras 1 and 2 to the target object. In other words, in the case where the target object is substantially in a state of rest, the information processing device 10 does not determine whether or not a correction is to be made on the distance from the cameras 1 and 2 to the target object. Accordingly, in the information processing device 10, it is possible to reduce a load in relation to calculation of the distance from the cameras 1 and 2 to the target object.

(Second Embodiment)

One embodiment of the system that is disclosed has been described above, however, the technique disclosed herein may be implemented in various different forms in addition to the embodiment described above. Now, another embodiment will be described below.

The operation determination unit 153 of the information processing device 10 may determine which information in the display information 141 has been selected by using the x-y coordinates (position) of the feature point of a target object in an image, the position of the display information 141 that has been projected, and the result of touch analysis described above. For example, in the case where the operation determination unit 153 determines that a fingertip has touched on the display information 141 (document or the like) projected on a projection surface, the operation determination unit 153 determines that information in the display information 141 located at a position touched by the fingertip has been selected. In the case where the operation determination unit 153 determines that touching on the display information 141 projected on the projection surface has been stopped, the operation determination unit 153 determines that selection of the information has been cancelled.

It has been assumed that the operation determination unit 153 determines touching on a projection surface and stopping of touching by using the distance from the cameras 1 and 2 to the target object, however, determination is not limited to this. For example, the operation determination unit 153 may determine the details of various operations by using the distance from the cameras 1 and 2 to the target object (distance in the z-axis direction). The operation determination unit 153 may determine the details of an operation instructed by a gesture of a hand by using the distance from the cameras 1 and 2 to the hand, for example.

It has been described above that the operation determination unit 153 is included in the information processing device 10, however, the operation determination unit 153 may be provided outside the information processing device 10. In this case, the operation determination unit 153 receives, via the communication I/F unit 11, the result of calculation of the position of a target object obtained by the three-dimensional position calculation unit 152 or the position calculation unit 154 and determines the details of an operation.

Each element of each apparatus illustrated in the drawings depicts its functional concept and does not have to be physically configured as in the drawings. That is, the specific state of distribution or integration of each apparatus is not limited to that illustrated in the drawings and each apparatus may be configured by functionally or physically distributing or integrating the apparatus, in whole or in part, in an arbitrary unit in accordance with various loads, use conditions, or the like. For example, the processing units in the control unit 15 illustrated in FIG. 2 may be integrated or divided as appropriate. Furthermore, all or some of the processing functions executed by the processing units may be implemented by a CPU or a program interpreted and executed by the CPU or may be implemented as hardware using wired logic.

Figure 9:
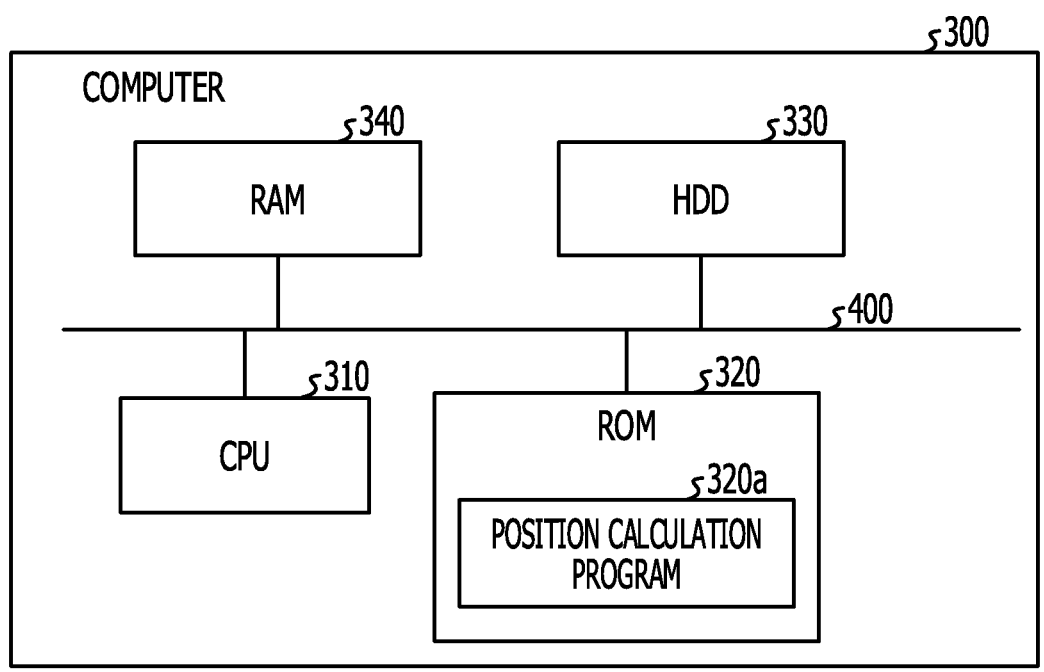
FIG. 9 is a diagram illustrating a computer that executes a position calculation program.

The processing of various types described in the foregoing embodiment may be implemented by causing a computer system, such as a personal computer or a workstation, to execute a program prepared in advance. Now, an example of a computer system that executes a program having functions similar to those described in the foregoing embodiment will be described. FIG. 9 is a diagram illustrating a computer that executes a position calculation program.

As illustrated in FIG. 9, a computer 300 includes a CPU 310, a read only memory (ROM) 320, a hard disk drive (HDD) 330, and a random access memory (RAM) 340. These units 310 to 340 are connected to one another via a bus 400.

In the ROM 320, a position calculation program 320a that fulfills functions similar to those executed by the processing units in the foregoing embodiment is stored in advance. For example, the position calculation program 320a that fulfills a function similar to that of the control unit 15 in the foregoing embodiment is stored. Note that, the position calculation program 320a may be separated as appropriate.

The HDD 330 stores data of various types. For example, the HDD 330 stores an OS and data of various types.

The CPU 310 reads the position calculation program 320a from the ROM 320 and executes the program to thereby perform operations similar to those performed by the processing units in the foregoing embodiment. That is, the position calculation program 320a performs operations similar to those performed by the control unit 15 in the foregoing embodiment.

The foregoing position calculation program 320a does not have to be stored in the ROM 320 from the beginning. The position calculation program 320a may be stored in the HDD 330.

For example, the position calculation program 320a may be stored in advance in a "portable physical medium", such as a flexible disk (FD), a compact disk read only memory (CD-ROM), a digital versatile disk (DVD), a magneto-optical disk, or an integrated circuit (IC) card, which is inserted into the computer 300. The computer 300 may read the position calculation program 320a from such a medium and execute the program.

Alternatively, the position calculation program 320a may be stored in advance in "another computer (or a server)" that is connected to the computer 300 using a public line or over the Internet, a LAN, or a wide area network (WAN). The computer 300 may read the position calculation program 320a from such a computer or a server and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a processor; and
   a memory which stores a plurality of instructions, which when executed by the processor, cause the processor to execute,
   acquiring images which includes a target object, and the images captured by a plurality of cameras on a time series basis;
   calculating a plurality of distance from the plurality of each cameras to a feature point of the target object by using the images;
   correcting, in a case where the target object has reached a predetermined x-y plane that is a projection surface and a difference in an area of the target object between the images is equal to or less than a predetermined first threshold, the distance that has been calculated to a reference distance from the cameras to the x-y plane; and
   determining that, in a case where the plurality of distance from the plurality of each cameras to the target object is equal to the reference distance from the plurality of each cameras to the x-y plane, the target object remains placed on the x-y plane and that display information projected on the x-y plane has been selected, and determining that, in a case where the plurality of distance from the plurality of each cameras to the target object is less than the reference distance from the plurality of each cameras to the x-y plane, the target object has been moved away from the x-y plane and that the display information has not been selected.

2. The information processing device according to claim 1, wherein the correcting includes determining, in a case where a movement length of the target object on the x-y plane in the images has been determined to exceed a predetermined second threshold, whether or not the difference in the area of the target object between the images is equal to or less than the predetermined first threshold, and correcting the plurality of distance that has been calculated to the plurality of distance from the plurality of each cameras to the x-y plane.

3. The information processing device according to claim 1, further comprising:
   displaying display information over a predetermined projection surface which faces to the plurality of cameras;
   wherein the predetermined x-y plane corresponds to the predetermined projection surface.

4. An information processing method comprising:
   acquiring images which includes a target object, and the images captured by a plurality of cameras on a time series basis;
   calculating, by a computer processor, a plurality of distance from the plurality of each cameras to a feature point of the target object by using the images;
   correcting, in a case where the target object has reached a predetermined x-y plane that is a projection surface and a difference in an area of the target object between the images is equal to or less than a predetermined first threshold, the distance that has been calculated to a reference distance from the cameras to the x-y plane; and
   determining that, in a case where the plurality of distance from the plurality of each cameras to the target object is equal to the reference distance from the plurality of each cameras to the x-y plane, the target object remains placed on the x-y plane and that display information projected on the x-y plane has been selected, and determining that, in a case where the plurality of distance from the plurality of each cameras to the target object is less than the reference distance from the plurality of each cameras to the x-y plane, the target object has been moved away from the x-y plane and that the display information has not been selected.

5. The information processing method according to claim 4,
wherein the correcting includes determining, in a case where a movement length of the target object on the x-y plane in the images has been determined to exceed a predetermined second threshold, whether or not the difference in the area of the target object between the images is equal to or less than the predetermined first threshold, and correcting the plurality of distance that has been calculated to the plurality of distance from the plurality of each cameras to the x-y plane.

6. The information processing method according to claim 4, further comprising:
displaying display information over a predetermined projection surface which faces to the plurality of cameras;
wherein the predetermined x-y plane corresponds to the predetermined projection surface.

7. A non-transitory computer-readable storage medium storing an information processing program that causes a computer to execute a process comprising:
acquiring images which includes a target object, and the images captured by a plurality of cameras on a time series basis;
calculating a plurality of distance from the plurality of each cameras to a feature point of the target object by using the images;
correcting, in a case where the target object has reached a predetermined x-y plane that is a projection surface and a difference in an area of the target object between the images is equal to or less than a predetermined first threshold, the distance that has been calculated to a reference distance from the cameras to the x-y plane; and determining that, in a case where the plurality of distance from the plurality of each cameras to the target object is equal to the reference distance from the plurality of each cameras to the x-y plane, the target object remains placed on the x-y plane and that display information projected on the x-y plane has been selected, and determining that, in a case where the plurality of distance from the plurality of each cameras to the target object is less than the reference distance from the plurality of each cameras to the x-y plane, the target object has been moved away from the x-y plane and that the display information has not been selected.

8. The computer-readable storage medium according to claim 7,
wherein the correcting includes determining, in a case where a movement length of the target object on the x-y plane in the images has been determined to exceed a predetermined second threshold, whether or not the difference in the area of the target object between the images is equal to or less than the predetermined first threshold, and correcting the plurality of distance that has been calculated to the plurality of distance from the plurality of each cameras to the x-y plane.

9. The computer-readable storage medium according to claim 7, further comprising:
displaying display information over a predetermined projection surface which faces to the plurality of cameras;
wherein the predetermined x-y plane corresponds to the predetermined projection surface.

* * * * *